US010210279B2

(12) United States Patent
Bhattal et al.

(10) Patent No.: US 10,210,279 B2
(45) Date of Patent: Feb. 19, 2019

(54) METHOD, APPARATUS AND SOFTWARE FOR DIFFERENTIATING TWO OR MORE DATA SETS HAVING COMMON DATA SET IDENTIFIERS

(75) Inventors: Amardeep S. Bhattal, Winchester (GB); Malcolm A. Couldwell, Winchester (GB); Peter T. Crocker, Winchester (GB); Bernard Z. Kufluk, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 12/914,942

(22) Filed: Oct. 28, 2010

(65) Prior Publication Data

US 2011/0153622 A1 Jun. 23, 2011

(30) Foreign Application Priority Data

Oct. 28, 2009 (EP) .................................... 09174303

(51) Int. Cl.
 *G06F 17/30* (2006.01)
(52) U.S. Cl.
 CPC .............................. *G06F 17/30943* (2013.01)
(58) Field of Classification Search
 USPC ........................................................ 707/749
 See application file for complete search history.

(56) References Cited

U.S. PATENT DOCUMENTS

| 5,875,446 | A  |   | 2/1999  | Brown et al. |
|-----------|----|---|---------|-----|
| 5,878,418 | A  | * | 3/1999  | Polcyn et al. |
| 6,360,227 | B1 | * | 3/2002  | Aggarwal ......... G06F 17/30873 |
| 6,560,620 | B1 |   | 5/2003  | Ching |
| 6,618,727 | B1 |   | 9/2003  | Wheeler et al. |
| 6,839,724 | B2 |   | 1/2005  | Manchanda et al. |
| 6,985,898 | B1 |   | 1/2006  | Ripley et al. |
| 7,133,913 | B2 | * | 11/2006 | Thwaites et al. ............. 709/224 |
| 7,272,594 | B1 |   | 9/2007  | Lynch et al. |
| 8,136,033 | B1 | * | 3/2012  | Bhargava et al. ............ 715/249 |
| 2004/0034656 | A1 | * | 2/2004 | Beesley ..................... 707/104.1 |
| 2004/0036716 | A1 | * | 2/2004 | Jordahl ......................... 345/713 |
| 2006/0041597 | A1 | * | 2/2006 | Conrad ............... G06F 17/3061 |
| 2006/0248273 | A1 | * | 11/2006 | Jernigan, IV ........... G06F 3/061 711/114 |
| 2007/0033163 | A1 | * | 2/2007 | Epstein et al. .................... 707/3 |
| 2007/0050423 | A1 | * | 3/2007 | Whalen ............. G06F 17/30159 |
| 2007/0217676 | A1 |   | 9/2007 | Grauman et al. |
| 2008/0177782 | A1 |   | 7/2008 | Poston et al. |
| 2010/0161526 | A1 | * | 6/2010 | Zhang .................... G06N 5/025 706/12 |
| 2010/0174688 | A1 | * | 7/2010 | Anumakonda et al. ...... 707/692 |
| 2011/0317579 | A1 | * | 12/2011 | Jones et al. ................... 370/252 |
| 2013/0212090 | A1 | * | 8/2013 | Sperling ............. G06F 17/3069 707/723 |
| 2015/0149468 | A1 | * | 5/2015 | Shukla ............... G06K 9/00684 707/740 |

OTHER PUBLICATIONS

Goldman, R. et al "Proximity search in databases" in Proc. 24th VLDB Conf., New York 1998, p. 26-37.

* cited by examiner

*Primary Examiner* — Ashish Thomas
*Assistant Examiner* — Mellissa M. Ohba
(74) *Attorney, Agent, or Firm* — Steven M. Greenberg, Esq.; Shutts & Bowen LLP (57) ABSTRACT

A method, apparatus and software are disclosed which enables the differentiation of two or more data sets having common data set identifiers.

35 Claims, 5 Drawing Sheets

| File Management Application Program User Interface | | |
|---|---|---|
| File Name | Difference Data | Namespace |
| A | - | http://x.y.com/vc |
| B | endpoint:http://testing1 | http://a.b.com/sr |
| B | endpoint:http://production1 | http://a.b.com/sr |
| C | endpoint:http://testing1 | http://c.d.com/testing |
| C | endpoint:http://production1 | http://c.d.com/testing |
| C | endpoint:http://none | http://c.d.com/testing |

METHOD, APPARATUS AND SOFTWARE FOR DIFFERENTIATING TWO OR MORE DATA SETS HAVING COMMON DATA SET IDENTIFIERS

CROSS-REFERENCE TO RELATED APPLICATIONS

This application claims priority under 35 U.S.C. § 119(a) to European Patent Application Serial Number 09174303.9, filed Oct. 28, 2009, entitled "A METHOD, APPARATUS AND SOFTWARE FOR DIFFERENTIATING TWO OR MORE DATA SETS HAVING COMMON DATA SET IDENTIFIERS", the entirety of which is incorporated herein by reference.

FIELD OF INVENTION

The present invention relates to a method, apparatus or software for differentiating two or more data sets having common data set identifiers.

BACKGROUND OF THE INVENTION

In computer systems, data is stored in data sets such as files that are assigned a data set identifier such as a file name. In order to uniquely identify a given file, its file name needs to be unique in a given storage space. However, one problem is that files can be assigned file names that are duplicates of other file names. System or application programs are provided for identifying such duplicate file names in a given storage space thus enabling the renaming of the files if appropriate so that their contents or associated data can be subsequently distinguished. However, a problem with such systems is that renaming may not always be appropriate and may have consequential effects. For example, other functionality may be dependent on a file having a particular file name. Changing such a file name may result in the dependent functionality failing to operate correctly.

SUMMARY OF THE INVENTION

An embodiment of the invention provides a method for differentiating two or more data sets having common data set identifiers, the method comprising the steps of: selecting a plurality of data sets comprising one or more data elements, each data set being associated with a data set identifier; identifying in the selected plurality of data sets a group of the data sets having a common data set identifier; comparing each data set in the group with each other data set in the group so as to identify one or more differentiating characteristics between the data sets in the group; and associating difference data representing one or more of the identified differentiating characteristics with the corresponding data set so as to provide one or more differentiators between two or more of data sets of the group.

The difference data may be presented to a user in association with the corresponding data set identifier for the corresponding selected data set. The difference data may be presented to a user in response to the selection of the plurality of data sets. The data sets may each comprise a network of related data elements, the network being provided by predetermined associations between the data elements. The network may be hierarchical. The network may be non-cyclic. Each data set may comprise an object graph. The differentiating characteristics may be identified by comparing the data elements of data sets having common data set identifiers in accordance with a predetermined schema. The data elements may comprise a data element type, one or more data element values or one or more data element associations to one or more other data elements and each differentiating characteristic comprises a differing data element type, data element value or data element association between a given data element and a corresponding element of one or more other data sets of the group. The absence of a characteristic of a data element of a first data set when compared to a corresponding element of one or more second data sets of the group may comprise a differentiating characteristic of the first data set.

The differentiating characteristics may be ranked in accordance with a predetermined set of ranking rules. The data sets may be hierarchical and each differentiating characteristic ranked in dependence on the depth of the relevant data element from the root of the relevant data set. Each differentiating characteristic may be ranked in dependence on the differentiating characteristic being a data element type, value or association. Differentiating characteristics comprising a data element type may be ranked higher than a differentiating characteristic comprising a data element value or data element association. Differentiating characteristics comprising a data element value may be ranked higher than a differentiating characteristic comprising a data element association. A predetermined number of the highest ranked differentiating characteristics may be selected for associating as difference data with the corresponding data set so as to provide one or more differentiators between two or more of data sets of the group. The difference data may be presented to a user in association with the corresponding data set identifier for the corresponding selected data set as the difference data is calculated, the difference data being updated if further difference data is calculated. The method may be used in a file management application program. The method may be used in a service-oriented architecture management application program.

Another embodiment provides apparatus for differentiating two or more data sets having common data set identifiers, the apparatus being operable to: select a plurality of data sets comprising one or more data elements, each data set being associated with a data set identifier; identify in the selected plurality of data sets a group of the data sets having a common data set identifier; compare each data set in the group with each other data set in the group so as to identify one or more differentiating characteristics between the data sets in the group; and associate difference data representing one or more of the identified differentiating characteristics with the corresponding data set so as to provide one or more differentiators between two or more of data sets of the group.

A further embodiment provides a computer program comprising program code means adapted to perform a method, when the program is run on a computer, for differentiating two or more data sets having common data set identifiers, the method comprising the steps of: selecting a plurality of data sets comprising one or more data elements, each data set being associated with a data set identifier; identifying in the selected plurality of data sets a group of the data sets having a common data set identifier; comparing each data set in the group with each other data set in the group so as to identify one or more differentiating characteristics between the data sets in the group; and associating difference data representing one or more of the identified differentiating characteristics with the corresponding data set so as to provide one or more differentiators between two or more of data sets of the group.

Another embodiment provides a computer program comprising program code means adapted to provide apparatus, when the program is run on a computer, for differentiating two or more data sets having common data set identifiers, the apparatus being operable to: select a plurality of data sets comprising one or more data elements, each data set being associated with a data set identifier; identify in the selected plurality of data sets a group of the data sets having a common data set identifier; compare each data set in the group with each other data set in the group so as to identify one or more differentiating characteristics between the data sets in the group; and associate difference data representing one or more of the identified differentiating characteristics with the corresponding data set so as to provide one or more differentiators between two or more of data sets of the group.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
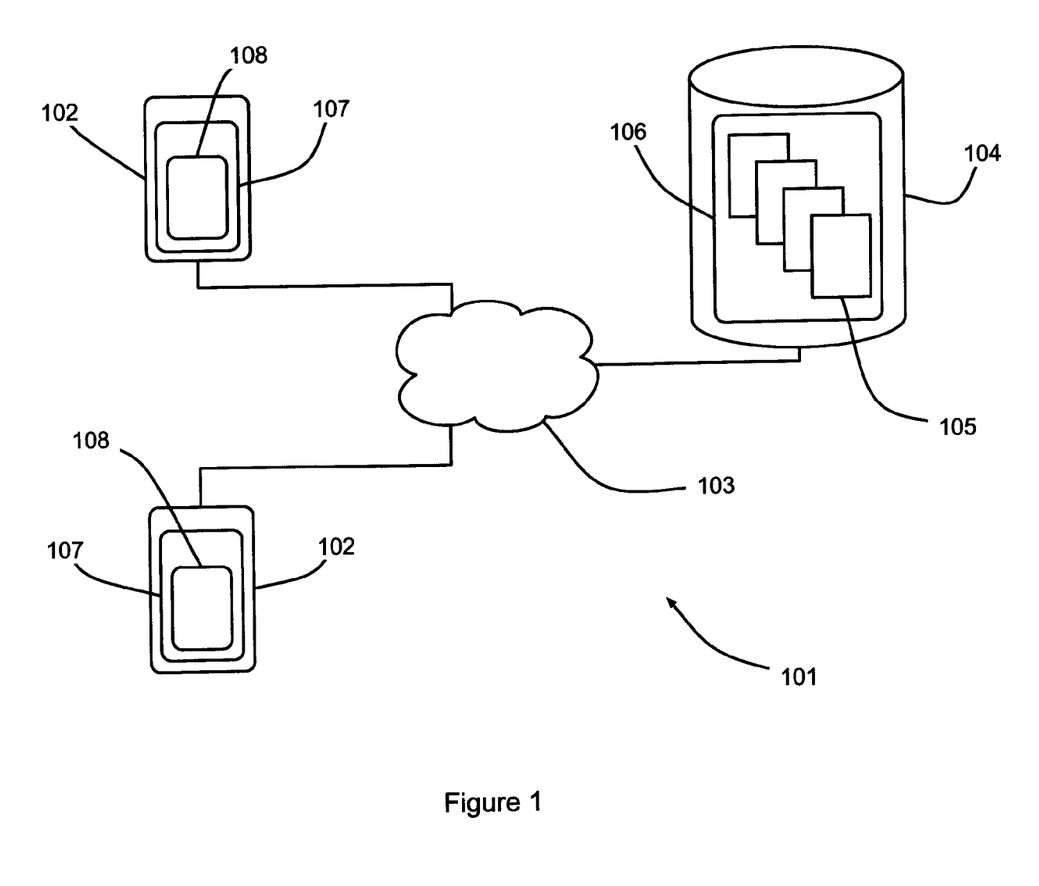
FIG. 1 is a schematic illustration of a computer system.

With reference to FIG. 1, a computer system 101 comprises a first and second computers 102 connected via a network 103 to a storage device 104. The storage device 104 is used to store data in the form of files 105 arranged in a file system 106. Each file is identified by a data set identifier in the form of a file name and located in a folder (not shown) within the file system 106. Each of the computers 102 is provided with software in the form of an operating system 107 arranged to provide a processing platform for one or more application programs. In the present embodiment, each of the computers 102 is provided with a file management application program 108.

Figure 2:
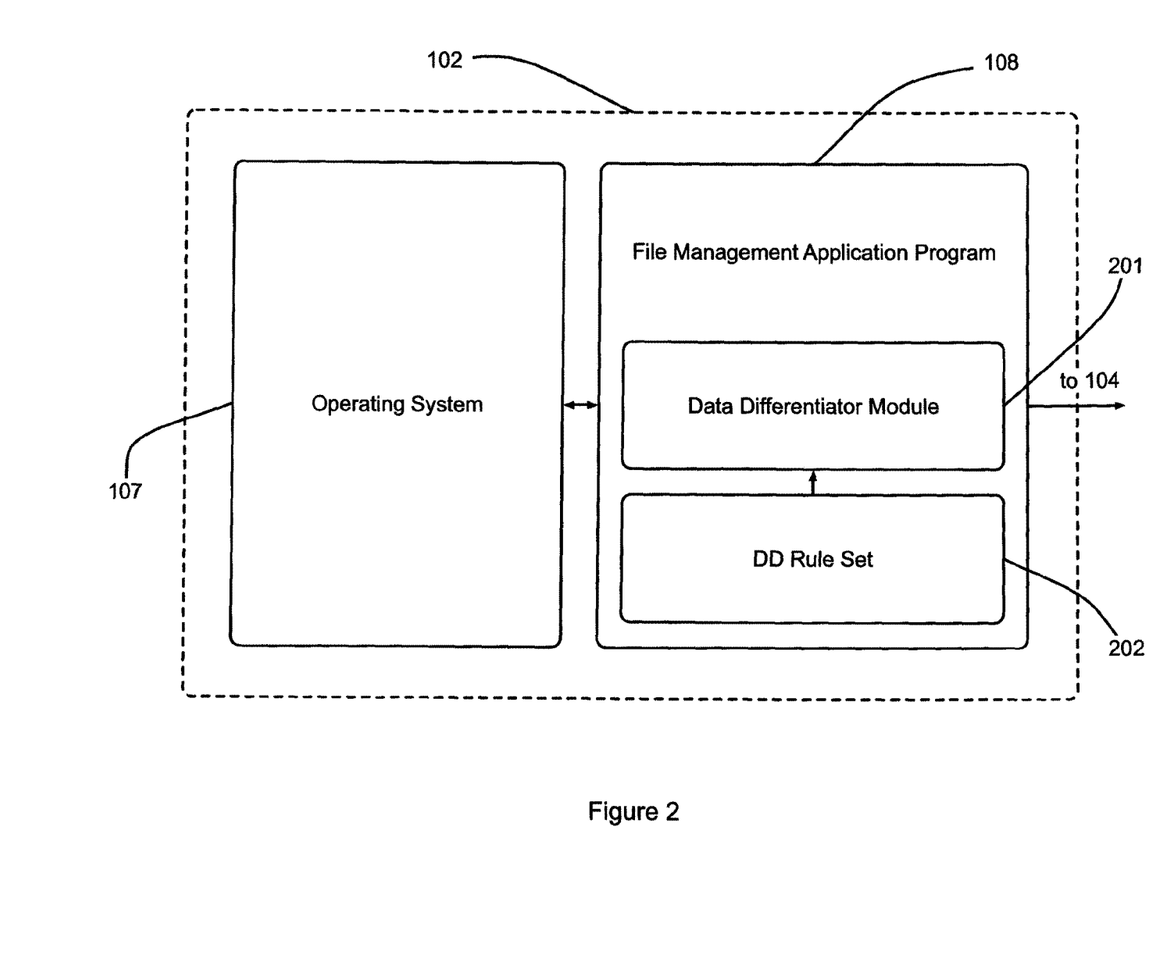
FIG. 2 is a schematic illustration of software comprising a data differentiator application program provided in the computer system of FIG. 1.

With reference to FIG. 2, the file management application program 108 is arranged to enable a user to select a set of files 105 on the storage device 104 for inspection. In the present embodiment, the file management application program 108 comprises a data differentiator (DD) module 201 and a data differentiator (DD) rule set 202. The DD module 201 is arranged to identify any groups of two or more files 105 in the set selected by the user that have duplicate or common file names. For each such identified group, the DD module 201 is arranged to compare the data sets associated with each such common file name and identify differences. In other words, the DD module 201 is arranged to identify differentiating characteristics between relevant data sets, in the form of the files 105, that have common data set identifiers, in the form of their corresponding file names. In the present embodiment, any such identified differences are then scored or ranked in accordance with a predetermined schema in the form of the DD rule set 202. The DD rule set 202 is a set of rules that apply different scores to predetermined types of differentiating characteristics of the data elements that make up each data set and are described in further detail below. A predetermined number of the highest ranked differentiating characteristics are then presented as difference data to the user so as to enable to the user to differentiate between the files having common file names as described in further detail below.

As will be understood by those skilled in the art, data sets may comprise many differing types of data elements that may have one or more attributes such as data values or one or more associations or relations with other such data elements in the data set. In the present embodiment, the file system 106 comprises data elements in the form of the files 105 that effectively form the nodes or vertices of a hierarchical data structure. The directories or folders of the file system 106 thus form the edges or associations in the hierarchical data structure.

Figure 3A:
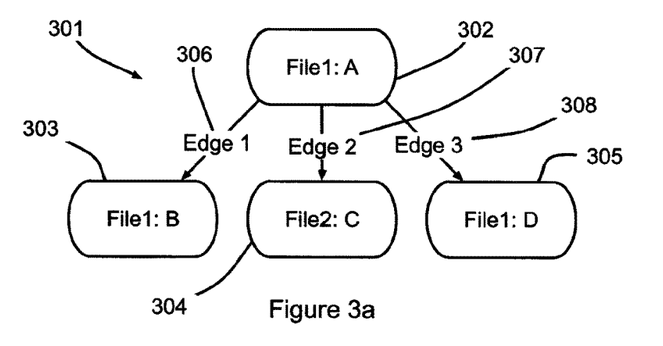
FIGS. 3a, 3b & 3c are a set of generalised examples of data sets having common data set identifiers.

FIG. 3a illustrates a first example of a data set 301 selected by a user from the file system 106. The first data set 301 is represented as a tree and comprises four data elements or nodes 302, 303, 304, 305 and three edges 306, 307, 308. The root node 302 represents the file 105 selected by the user from a first directory in the file system 106 and has an associated value comprising a data set identifier in the form of the file name. In the present embodiment, any given file may be one of a number of different file types, each file type having an associated file name. Each of the edges 306, 307, 308 represent second directories that are subdirectories to the first directory and each edge 306, 307, 308 comprises an identifier in the form of the name of the corresponding subdirectory. Each of the child nodes 303, 304, 305 represents a file 105 in the relevant subdirectory and has a value associated with it that comprises a data set identifier in the form of the relevant file name.

Figure 3B:
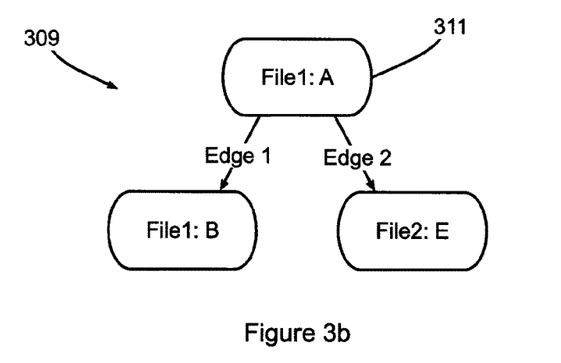
Figure 3C:
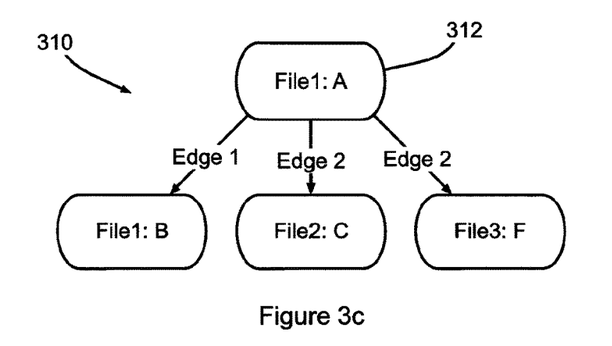

FIGS. 3b & 3c illustrate second and third examples of data sets 309, 310 identified by the DD module 201 within the selection made by the user from the file system 106. The DD module 201 identifies the first, second and third data sets 301, 309, 310 since their root nodes 302, 311, 312 have the same value, that is, the respective root nodes 302, 311, 312 all represent files having the same file name. In the present embodiment, the DD module 201 is arranged to differentiate between data sets having common identifiers, such as the example data sets 301, 309, 310, by comparing each data element of the relevant set in an attempt to identify one or more differentiating characteristics. The comparison starts with the root nodes of each data set 301, 309, 310. The nodes at the end of each edge of the root node are then compared, and so on down the object graph in a breadth first traversal. Not all graphs may have all edges, and hence comparable child nodes, nevertheless the comparison process is arranged to proceed even if only a subset of graphs possess a given edge.

In the present embodiment, differentiating characteristics comprise one of three types. The first type of differentiating characteristic is whether any one of the data sets comprises one or more non-common edges, which, in the present example, would represent non-common directories in the file system 106. For example, the first data set 301 comprises an edge "Edge 3" that is not present in either the second or third data sets 309, 310. Thus the edge "Edge 3" comprises a differentiating characteristic for the first data set 301.

The second type of differentiating characteristic is whether the data sets comprise a common property that has a non-common value, which, in the present example, would represent common file types each having non-common files names. For example, all of the data sets 301, 309, 310 comprise a node of file type "File2" but the file name for the common node in the second data set 309 has a unique value of "E". Thus the node "File2: E" comprises a differentiating characteristic for the second data set 309.

The third type of differentiating characteristic is whether any of the data sets comprises a non-common property, which, in the present example, would represent non-common file types. For example, all of the data sets 301, 309, 310 comprise a node of file type "File1" or "File2" but only the third data set 310 comprises a node of the file type "File3". Thus the presence of a node of type "File3" comprises a differentiating characteristic for the third data set 310.

In the present embodiment, the DD rule set 202 defines scores assigned to the differentiating characteristics identified in the relevant data sets. The assigned scores are used by the DD module 201 to rank the differentiating characteristics for a given data set. The scores are determined in dependence on the type of a given differentiating characteristic and the depth in the hierarchy at which the differentiating characteristic is located. In the present embodiment, the first type of differentiating characteristic is scored highest, the second type of differentiating characteristic is scored next highest and the third type of differentiating characteristic is scored lowest. In addition, the score for a given differentiating characteristic is reduced in proportion to the depth in the hierarchy or graph at which the given differentiating characteristic is located. In other words, the lower down the hierarchy or graph that a given differentiating characteristic is located, the lower its assigned score.

When calculating the score for a given differentiating characteristic, the DD module 201 uses two predetermined functions. The first function is referred to herein as uniqueness and is a measure of how uncommon a given differentiating characteristic is in the data sets being compared. Uniqueness (U) is given by the following equation:

$$U(N, n) = (N-n)/N$$

where N is the total number of data elements to be considered, of which n have some attribute. So as $n \Rightarrow N$, $U \Rightarrow 0$ as there is no uniqueness as all elements have the attribute. Conversely, as $n \Rightarrow 0$, $U \Rightarrow 1$. The second function is referred to herein as commonality and is a measure of how common a given differentiating characteristic is in the data sets being compared. Commonality (C) is given by the following equation:

$$C(N, n) = n/N$$

where again N is the total number of elements to be considered, of which n have some attribute. So as $n \Rightarrow N$, $C \Rightarrow 1$ and as $n \Rightarrow 0$, $C \Rightarrow 0$. Thus, commonality is a measure of the proportion of objects that possess the given attribute.

As noted above, the score assigned to a given differentiating characteristic is reduced in proportion to the depth D of the differentiating characteristic in the graph. From the relevant root node 302, 311, 312 the depth D is incremented. For example, the root level has a depth of D=1, the children of the root have a depth of D=2, the children's children have a depth of D=3.

Thus, in the present embodiment, the DD module 201 is arranged to calculate the scores for each of the three types of differentiating characteristics in accordance with the respective scoring formulae as described below. The first type of differentiating characteristic is scored most highly since, in the present embodiment, non-common or more unique relationships are preferred differentiators. The edges in the graph represent associations or relationships between nodes and are named. This means that the presence of specific edge can be determined across multiple graphs. For example, a "Parent" node may be linked by a "hasChild" edge to a "Child" node in the graph. Multiple graphs can be examined to see if the "hasChild" relationship/edge is present on any given node. Thus the DD module 201 is arranged to generate differentiator scores for each uniquely named edge on the current nodes in each graph under consideration. The DD module uses the following first formula:

$$\text{Score} = (3/D) * U(N\_\text{graph}, n\_\text{rel})$$

where N_graph is the number of graphs being compared, and n_rel is the number of nodes that possess the current edge being considered. Here the function U is used to evaluate how unique the presence of a given edge is.

The second type of differentiating characteristic is scored less highly than the first since, in the present embodiment, common properties with different values are considered good differentiators. Properties are attributes of the nodes in the graph such as name-value pairs that apply to a node. Thus the DD module 201 is arranged to generate differentiator scores for all uniquely named properties on all current nodes in each graph under consideration using the following formula:

$$\text{Score} = (2/D) * C(N\_\text{graph}, n\_\text{prop}) * C(n\_\text{prop}, n\_\text{value})$$

where N_graph is the number of graphs being compared, n_prop is the number of nodes that possess the current property being considered and n_value is the number of distinct values the property has on the nodes under consideration. Here, the function C is used to evaluate both how common the presence of the property is, and how common its different values are.

The third type of differentiating characteristic is scored least highly since, in the present embodiment, non-common or more unique properties are considered as acceptable differentiators. Scoring is similar to the relationship existence scoring scheme, but with a smaller weighting given to this test, $$\text{Score} = (1/D) * U(N\_\text{graph}, n\_\text{prop})$$

Figure 4:
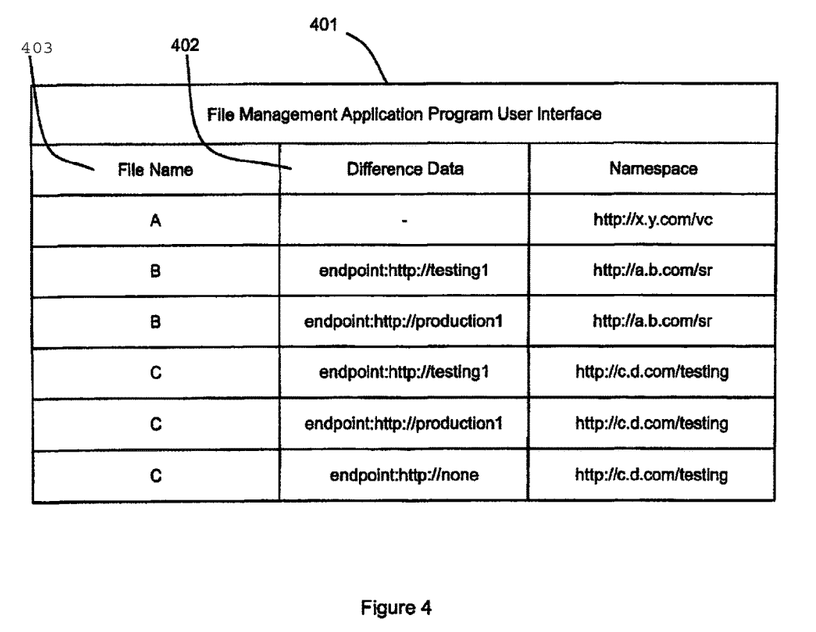
FIG. 4 is a schematic illustration of a file management application program window displaying data sets having common data set identifiers in combination with difference data representing differentiating characteristics for differentiating the data sets.

With reference to FIG. 4, once the DD module 201 has calculated scores for each identified differentiating characteristic in the relevant data sets, in the present embodiment, the highest scoring differentiating characteristic is displayed as difference data to the user in association with the relevant file name. In the present embodiment, the file management application program user interface 401 is arranged to display the relevant differentiating characteristic as difference data in a specialized column 402 adjacent the filename column 403. Thus the user is automatically provided with data for differentiating between data sets, in the form of files that comprise common data set identifiers in the form of file names. The differentiating characteristics that appear in the user interface 401 are displayed with their values as shown in FIG. 4, for example, "endpoint: http://test1". Furthermore, in the present embodiment, where the absence of an edge or property is a differentiating characteristic this is displayed accordingly, for example, "endpoint: <none>".

Figure 5:
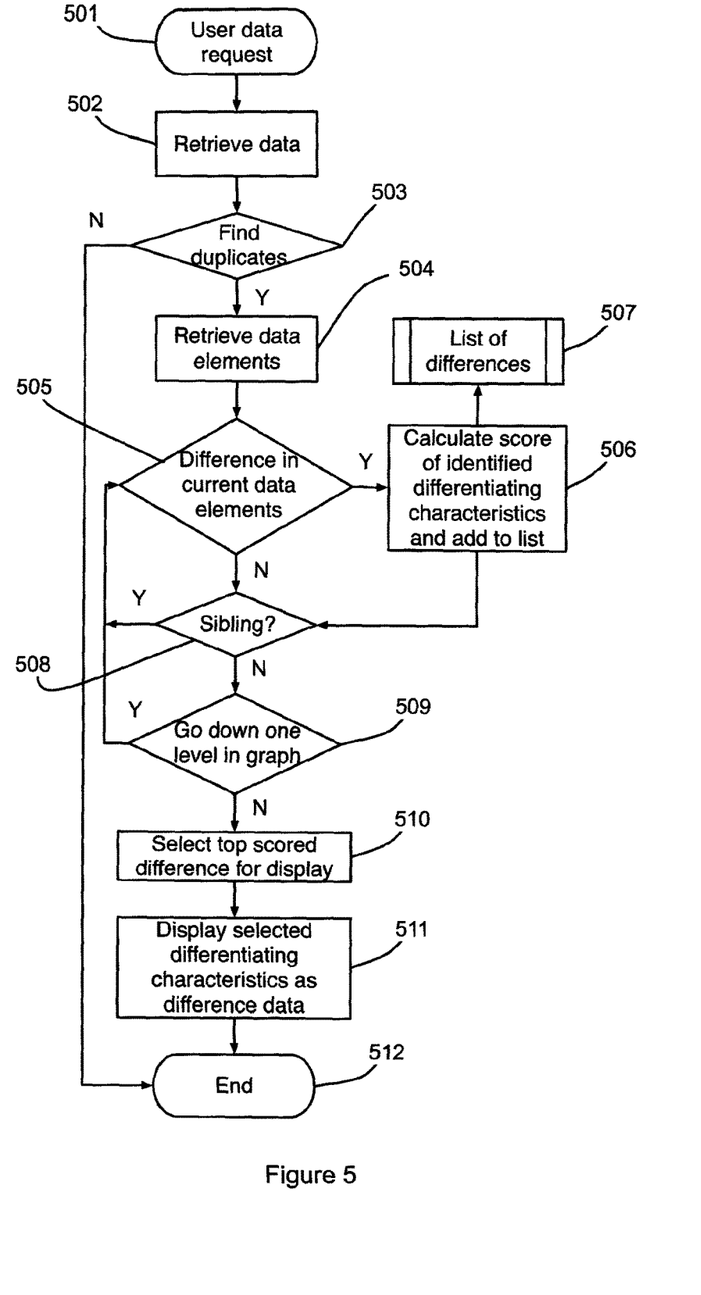
FIG. 5 is a flow chart illustrating processing performed by the data differentiator application program of FIG. 2 when determining difference data for two or more data sets having common data set identifiers.

The processing performed by the DD module 201 when identifying a data set having common data set identifiers will now be described in further detail with reference to the flow chart of FIG. 5. Processing is initiated at step 501, in response to a user selection of data from the file system 106 via the interface 401 and processing moves to step 502. At step 502, the selected data is retrieved from the file system 106 and processing moves to step 503. At step 503, the data is searched to identify any selected data sets in the form of two or more files having common data set identifiers in the form of their filenames. If no common file names are identified then processing moves to step 512 and ends. If such common file names are identified then processing moves to step 504. At step 504, for each identified group of data sets having common data set identifiers, the relevant data elements for the selected data sets are retrieved and processing moves to step 505. At step 505, the relevant data elements across each identified data set are compared to identify any of the predetermined types of differences that constitute differentiating characteristics and if one or more are identified processing moves to step 506. At step 506, the identified characteristics are scored in accordance with the scoring rules described above and then logged in a list 507 of identified scored differentiating characteristics. Processing then moves to step 508 where the relevant hierarchies are inspected to determine whether the most recent node has any unprocessed siblings since the comparison is a breadth first process. If any sibling are identified processing returns to step 505 and proceeds as described above. If no unprocessed siblings are identified then processing moves to step 509 where the comparison process moves to nodes in the next level down of the hierarchy of the data structure and processing then returns to step 505 and proceeds as described above. If at step 509 no further nodes are present in any of the data structures being compared then processing move to step 510. At step 510, the highest scoring differentiating characteristic logged in the list 507 for the relevant data set is identified and processing moves to step 511. At step 511, the highest scoring differentiating characteristic is displayed as difference data in the interface 401 in the difference data column 402 against the relevant data set 403. Processing then moves to step 512 and ends.

In a further embodiment, the DD module is arranged to display two or more identified differentiating characteristics as difference data 402. The number of differentiating characteristics displayed as difference data may be selected by a user. The number of differentiating characteristics displayed as difference data may be determined automatically in accordance with a predetermined rule. For example, the number of differentiating characteristics displayed as difference data may be proportional to the number of data sets in an identified group having common data set identifiers.

In a further embodiment, the identified differentiating characteristics are displayed as difference data they are identified by the DD module. In other words, identified differentiating characteristics are displayed immediately or on-the-fly. As further differentiating characteristics are identified having higher scores than those currently displayed, the displayed difference data is updated accordingly. If the relevant entry in the difference data column of the user interface already shows its maximum number of differentiating characteristics then the lowest scoring displayed differentiating characteristic will be removed.

In another embodiment, all identified differentiating characteristics are displayed as difference data and no scoring is performed. In a further embodiment, the differentiating characteristics column in the user interface is only displayed if duplicate data set identifiers or differentiating characteristics are identified. In another embodiment, the identified differentiating characteristics are further processed to produce the displayed difference data. For example, the differentiating characteristics may be simplified when converted into difference data for display.

In another embodiment, the algorithm for searching for differentiating characteristics is optimised so that searching for types of lower scoring differentiating characteristics is abandoned if the required number of higher scoring differentiating characteristics has already been identified. For example, if the highest scoring type of differentiating characteristic is identified at a given depth in the data structure and only one differentiating characteristic is displayed then no further differentiating characteristics are searched for. Since the scores for differentiating characteristics are reduced as their depth in the data structure increases, there is no chance of finding higher scoring differentiating characteristics at such lower levels. Similar rules can be applied to the lower scoring types of differentiating characteristics such as the second and third types of differentiating characteristics in the embodiments described herein.

As will be understood by those skilled in the art, the technology described herein may be applied to any data set where common data set identifiers may be assigned to two or more data sets. The data sets can then be compared to identify any differentiating characteristics that may enable the data sets can be distinguished by a user or by one or more other system or application programs. Furthermore any suitable ranking or scoring systems may be employed that is suitable for a given application of the technology. In some embodiments, only one type of differentiating characteristic may be applicable and searched for. In some embodiments, scoring systems may be omitted.

In another embodiment, the data set comprises the service-oriented program objects stored in the registry of service-oriented architecture (SOA) system. Such objects are commonly linked together to form object graphs. Such graphs may comprise endpoints that describe the location at which the service embodied by the object graph can be accessed.

In another embodiment, the data set comprises resource description framework (RDF) data set, which is normally viewed as a graph. In another embodiment, the data set is a web ontology language (OWL) data set, which again is normally viewed as a graph.

As will be understood by those skilled in the art, the nodes of a suitable data set may comprise the directories or folders of a given file or data structure wherein the files presented in a given directory comprise attributes of a given node. The edges in such an arrangement would be provided as links to subdirectories for a given directory. Files with link or edge data comprising part of each file may provide the nodes of another suitable data set. Each such edge may be one of a plurality of types of edge. The edge or link data may be provided as a separate file or as meta-data to a given file.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method for differentiating two or more data sets having common data set identifiers, said method comprising the steps of:
   selecting in a user interface to a file system by a data differentiator module executing in memory of a computer, a plurality of data sets comprising one or more data elements, each said data set being associated with a data set identifier, the data sets being organized as different nodes of a hierarchical data structure;
   retrieving the selected plurality of data sets from the file system;
   searching the retrieved plurality of data sets and identifying in said selected and retrieved plurality of data sets a group of said data sets of two or more files having a duplicate data set identifier in the form of a filename for each of the two or more files;
   comparing each data set in said group with each other data set in said group so as to identify one or more differentiating characteristics between said data sets in said group;
   associating difference data representing one or more of said identified differentiating characteristics with the corresponding data set so as to provide one or more differentiators between two or more of data sets of said group and displaying in the user interface to the file system the one or more differentiators;
   scoring said identified differences in accordance with a data differentiator rule set comprising a set of rules that apply different scores to predetermined types of differentiating characteristics of the data elements that make up each data set, the scores being determined in dependence on a type of a given one of the differentiating characteristics and a depth in the hierarchical data structure at which the given one of the differentiating characteristics is located; and
   presenting in the user interface to the file system a predetermined number of a highest scored differentiating characteristics so as to enable an end user to differentiate between the files having common file names.

2. A method according to claim 1 in which said difference data is presented to a user in association with said corresponding data set identifier for said corresponding selected data set.

3. A method according to claim 1 in which said difference data is presented to a user in response to said selection of said plurality of data sets.

4. A method according to claim 1 in which said data sets each comprise a network of related data elements, said network being provided by predetermined associations between said data elements.

5. A method according to claim 4 in which said network is hierarchical.

6. A method according to claim 4 in which said network is non-cyclic.

7. A method according to claim 1 in which each said data set comprises an object graph.

8. A method according to claim 1 in which said differentiating characteristics are identified by comparing said data elements of data sets having duplicate data set identifiers in accordance with a predetermined schema.

9. A method according to claim 1 in which said data elements comprise a data element type, one or more data element values or one or more data element associations to one or more other data elements and each said differentiating characteristic comprises a differing data element type, data element value or data element association between a given data element and a corresponding element of one or more other data sets of said group.

10. A method according to claim 1 in which the absence of a characteristic of a data element of a first data set when compared to a corresponding element of one or more second data sets of said group comprises a differentiating characteristic of said first data set.

11. A method according to claim 1 in which said differentiating characteristics are ranked in accordance with a predetermined set of ranking rules.

12. A method according to claim 1 in which said data sets are hierarchical and each said differentiating characteristic is ranked in dependence on the depth of the relevant data element from the root of the relevant data set.

13. A method according to claim 1 in which each said differentiating characteristic is ranked in dependence on said differentiating characteristic being a data element type, value or association.

14. A method according to claim 13 in which differentiating characteristics comprising a data element type is ranked higher than a differentiating characteristic comprising a data element value or data element association.

15. A method according to claim 13 in which differentiating characteristics comprising a data element value is ranked higher than a differentiating characteristic comprising a data element association.

16. A method according to claim 11 in which a predetermined number of the highest ranked differentiating characteristics are selected for associating as difference data with the corresponding data set so as to provide one or more differentiators between two or more of data sets of said group.

17. A method according to claim 1 in which said difference data is presented to a user in association with said corresponding data set identifier for said corresponding selected data set as said difference data is calculated, said difference data being updated if further difference data is calculated.

18. An apparatus for differentiating two or more data sets having common data set identifiers, said apparatus comprising a computer and being executed in memory of the computer to:
   select in a user interface to a the system a plurality of data sets comprising one or more data elements, each said data set being associated with a data set identifier, the data sets being organized as different nodes of a hierarchical data structure;
   retrieve the selected plurality of data sets from the file system;
   search the retrieved plurality of data sets and identify in said selected and retrieved plurality of data sets a group of said data sets of two or more files having a duplicate data set identifier in the form of a filename for each of the two or more files;
   compare each data set in said group with each other data set in said group so as to identify one or more differentiating characteristics between said data sets in said group; associate difference data representing one or more of said identified differentiating characteristics with the corresponding data set so as to provide one or more differentiators between two or more of data sets of said group and display in the user interface to the file system the one or more differentiators;

score said identified differences in accordance with a data differentiator rule set comprising a set of rules that apply different scores to predetermined types of differentiating characteristics of the data elements that make up each data set, the scores being determined in dependence on a type of a given one of the differentiating characteristics and a depth in the hierarchical data structure at which the given one of the differentiating characteristics is located; and present in the user interface to the file system a predetermined number of a highest scored differentiating characteristics so as to enable an end user to differentiate between the files having common the names.

19. An apparatus according to claim 18 in which said difference data is presented to a user in association with said corresponding data set identifier for said corresponding selected data set.

20. An apparatus according to claim 18 in which said difference data is presented to a user in response to said selection of said plurality of data sets.

21. An apparatus according to claim 18 in which said data sets each comprise a network of related data elements, said network being provided by predetermined associations between said data elements.

22. An apparatus according to claim 21 in which said network is hierarchical.

23. An apparatus according to claim 21 in which said network is non-cyclic.

24. An apparatus according to claim 18 in which each said data set comprises an object graph.

25. An apparatus according to claim 18 in which said differentiating characteristics are identified by comparing said data elements of data sets having duplicate data set identifiers in accordance with a predetermined schema.

26. An apparatus according to claim 18 in which said data elements comprise a data element type, one or more data element values or one or more data element associations to one or more other data elements and each said differentiating characteristic comprises a differing data element type, data element value or data element association between a given data element and a corresponding element of one or more other data sets of said group.

27. An apparatus according to claim 18 in which the absence of a characteristic of a data element of a first data set when compared to a corresponding element of one or more second data sets of said group comprises a differentiating characteristic of said first data set.

28. An apparatus according to claim 18 in which said differentiating characteristics are ranked in accordance with a predetermined set of ranking rules.

29. An apparatus according to claim 18 in which said data sets are hierarchical and each said differentiating characteristic is ranked in dependence on the depth of the relevant data element from the root of the relevant data set.

30. An apparatus according to claim 18 in which each said differentiating characteristic is ranked in dependence on said differentiating characteristic being a data element type, value or association.

31. An apparatus according to claim 30 in which differentiating characteristics comprising a data element type is ranked higher than a differentiating characteristic comprising a data element value or data element association.

32. An apparatus according to claim 30 in which differentiating characteristics comprising a data element value is ranked higher than a differentiating characteristic comprising a data element association.

33. An apparatus according to claim 28 in which a predetermined number of the highest ranked differentiating characteristics are selected for associating as difference data with the corresponding data set so as to provide one or more differentiators between two or more of data sets of said group.

34. An apparatus according to claim 18 in which said difference data is presented to a user in association with said corresponding data set identifier for said corresponding selected data set as said difference data is calculated, said difference data being updated if further difference data is calculated.

35. A computer program product comprising a non-transitory computer medium storing computer readable program code means adapted to perform a method of differentiating two or more data sets having common data set identifiers, the computer readable program code comprising:

computer readable program code for selecting in a user interface to a file system by a plurality of data sets comprising one or more data elements, each said data set being associated with a data set identifier, the data sets being organized as different nodes of a hierarchical data structure;

computer readable program code for retrieving the selected plurality of data sets from the file system;

computer readable program code for searching the retrieved plurality of data sets and identifying in said selected and retrieved plurality of data sets a group of said data sets of two or more files having a duplicate data set identifier in the form of a filename for each of the two or more files;

computer readable program code for comparing each data set in said group with each other data set in said group so as to identify one or more differentiating characteristics between said data sets in said group; and computer readable program code for associating difference data representing one or more of said identified differentiating characteristics with the corresponding data set so as to provide one or more differentiators between two or more of data sets of said group and displaying in the user interface to the file system the one or more differentiators computer readable program code for scoring said identified differences in accordance with a data differentiator rule set comprising a set of rules that apply different scores to predetermined types of differentiating characteristics of the data elements that make up each data set, the scores being determined in dependence on a type of a given one of the differentiating characteristics and a depth in the hierarchical data structure at which the given one of the differentiating characteristics is located; and computer readable program code for presenting in the user interface to the file system a predetermined number of a highest scored differentiating characteristics so as to enable an end user to differentiate between the files having common file names.

* * * * *